United States Patent

[11] 3,580,146

| | | | |
|---|---|---|---|
| [72] | Inventor | Joseph Biancamaria |  |
|  |  | Ivry sur Seine, France |  |
| [21] | Appl. No. | 797,487 |  |
| [22] | Filed | Feb. 7, 1969 |  |
| [45] | Patented | May 25, 1971 |  |
| [73] | Assignee | L'Homme (Societe Anonyme) |  |
|  |  | Paris, France |  |
| [32] | Priority | Feb. 7, 1968 |  |
| [33] |  | France |  |
| [31] |  | PV 139 051 |  |

[54] METHOD OF MAKING ACCURATELY DIMENSIONED SMOOTH-SURFACED MULTI-LAYER CARDBOARD TUBES
10 Claims, 6 Drawing Figs.

[52] U.S. Cl. .................................................. 93/94, -
93/36(MM), 93/59(MT), 93/77(CL), 93/80
[51] Int. Cl. .................................................. B31c 3/04,
B31c 11/04, B31b 1/64
[50] Field of Search .......................................... 93/36
(MM), 58 (ST), 59, 77 (CL), 80, 94

[56] References Cited
UNITED STATES PATENTS

| 168,365 | 10/1875 | Boles | 93/36(MM) |
|---|---|---|---|
| 3,524,779 | 8/1970 | Masters | 93/80X |
| 1,287,945 | 12/1918 | Ford | 93/94X |
| 1,375,108 | 4/1921 | Rees | 93/59X |
| 2,213,290 | 9/1940 | Rowe | 93/77(CL) |
| 3,270,778 | 9/1966 | Foll | 93/77(CL) |
| 3,354,800 | 11/1967 | Sato | 93/94 |
| 3,385,179 | 5/1968 | Roe | 93/94 |
| 3,406,614 | 10/1968 | Martin | 93/94(M) |
| 3,430,543 | 3/1969 | Cunningham | 93/94 |
| 3,280,709 | 10/1966 | Elam | 93/94 |

FOREIGN PATENTS

| 462,457 | 3/1937 | Great Britain | 93/94 |
|---|---|---|---|

Primary Examiner—Wayne A. Morse, Jr.
Attorney—Edwin E. Greigg

ABSTRACT: In order to obtain helically wound multilayer cardboard tubes of accurate diameter and very smooth external surface, the tubes are coated with a thermosetting resin and forced through the bore of a heated jacket to cause (1) curing of the resin and (2) reduction of the tube diameter to the precise desired dimensions. This reduction is taken up by a radially compressible layer of the tube.

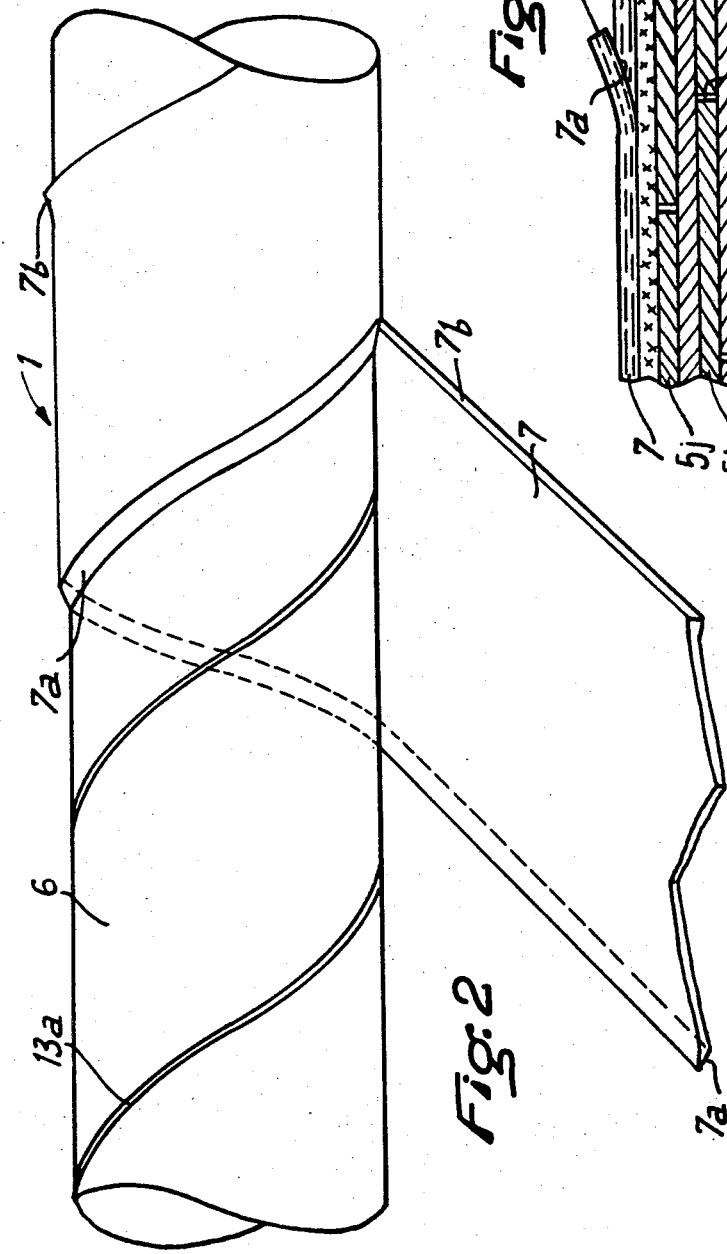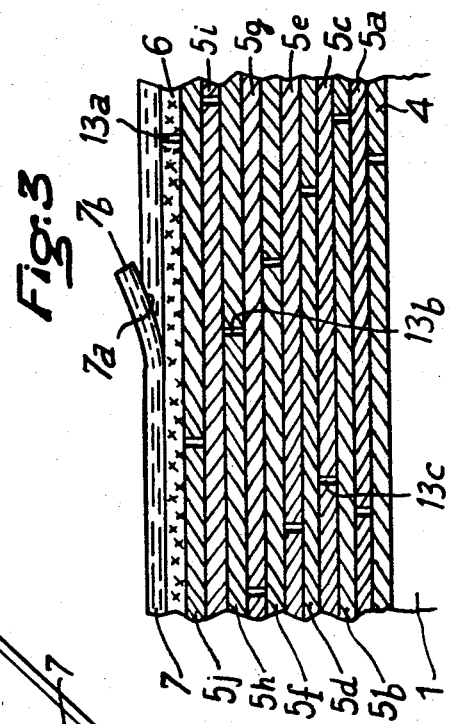

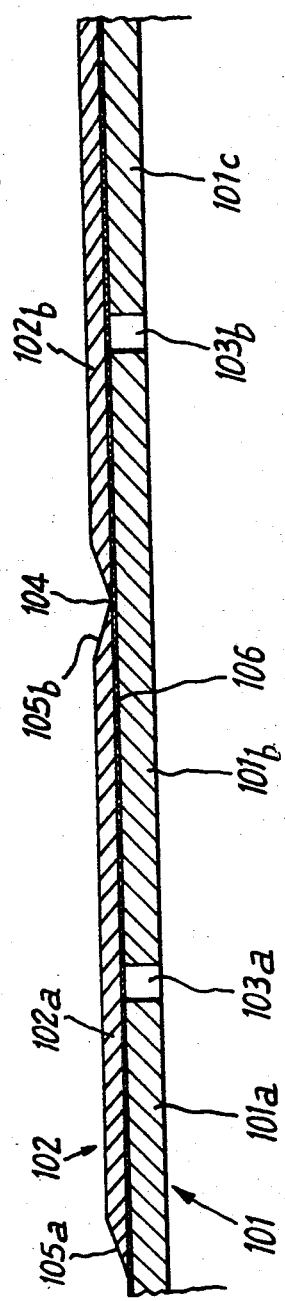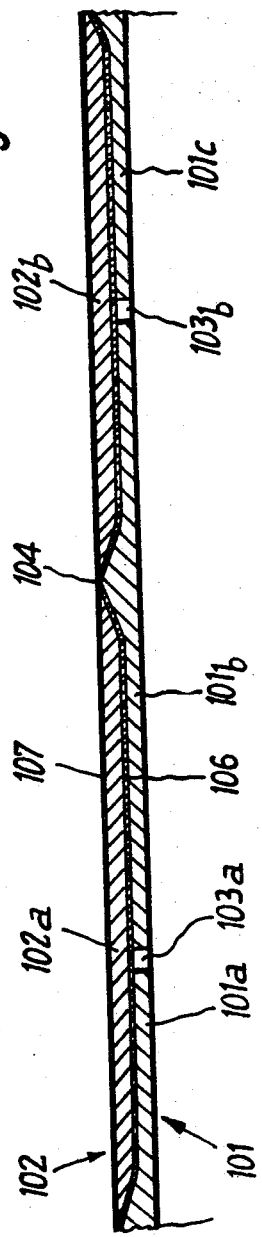

METHOD OF MAKING ACCURATELY DIMENSIONED SMOOTH-SURFACED MULTI-LAYER CARDBOARD TUBES

BACKGROUND OF THE INVENTION

It is well known to make cardboard tubes from a plurality of strips or "layers" of fibrous material, suitably glued, which are wound around a mandrel in a helix with a pitch approximately equal to the width of one strip. The successive superposed strips are offset relative to one another in the longitudinal direction of the tube.

Usually, for the manufacture of such tubes winding machines are used in which each of the strips is stored on a reel and passes, with the exception of the first, through a glueing bath before being wound around a fixed mandrel at a fixed angle relative to the axis thereof and slightly offset relative to the preceding, underlying strip. The tube thus formed is caused to rotate about the mandrel and is simultaneously longitudinally advanced by an endless belt turning about said mandrel.

In this manner a continuous tube is obtained which is cut into separate tubes of a given length by a severing device located at a distance from the winding head of the tube winding machine.

The surface condition of such a tube depends, in the first place, on the material constituting the outside layer, but is also affected by the setting of the tube winding machine. Since it is not possible to regulate the pitch of the winding in a perfect manner so as to obtain accurately abutting adjacent turns of the helically extending strip, small tolerances have to be accepted. For this reason it may occur that adjoining edges of two consecutive spiral turns are positioned either with a slight gap or with a slight overlap.

Similarly, it is necessary to accept a small tolerance in the outside diameter of the tube. Such a tolerance is a function of the tolerances of the thickness of the strips and of the tension applied to the said strips. Such tubes, with the imperfections noted, are acceptable for the majority of uses.

When, however, tubes of the aforenoted type are intended, for example, for the reeling of thin sheets or films, such as plastic films or any other product which may be easily damaged by defects in the surface of the tube, particularly when its material is sensitive to humidity or to heat, it is essential to use precisely gauged tubes having a perfectly smooth surface void of any irregularity or any helically extending depression.

Presently known processes relating to the manufacture of precisely gauged smooth tubes involve prohibitive expenses.

OBJECTS AND SUMMARY OF THE INVENTION

It is an object of the invention to provide an improved, helically wound, multilayer cardboard tube having a very smooth external face and an exact, predetermined diameter.

It is a further object of the invention to provide an improved method of manufacturing helically wound, multilayer cardboard tubes having a very smooth external face and an exact, predetermined diameter.

It is a further object of the invention to provide an improved apparatus for the manufacturing of helically wound, multilayer cardboard tubes having a very smooth external face and an exact, predetermined diameter.

Briefly stated, according to the invention, first a multilayer, helically wound rough tube of continuous length is prepared, preferably on a mandrel-type tube winding machine of known structure. One of the layers is of a low density material and is thus substantially compressible in a radial direction. Then the rough tube is externally coated with a thermosetting resin, cut into predetermined lengths and dried. Finally, the rough tubes are forcibly introduced, by means of a pusher head, into the bore of a heated matrix to reduce the circumference of the tube to the desired precise diameter and to cause polymerization of the resin coating. The diameter of the bore is smaller than that of the rough tubes. The circumferential shrinkage of the tubes is taken up by said low density layer which is compressed radially under the external, radially inwardly directed force generated by the cooperation of said pusher head and said bore.

The invention will be better understood and further objects as well as advantages will become apparent from the ensuing detailed specification taken in conjunction with the drawings.

BRIEF DESCRIPTION OF THE DRAWINGS

FIG. 2 is a perspective view illustrating the winding of the outer layer of a rough tube according to the invention;

FIG. 3 is a partial longitudinal section on an enlarged scale of the rough tube of FIG. 2;

FIG. 5 is a partial longitudinal section on an enlarged scale of the last two layers of a rough tube according to another embodiment of the invention, and FIG. 6 is a view similar to FIG. 5, showing the embodiment in a finished condition.

DESCRIPTION OF THE APPARATUS AND THE ARTICLE MADE THEREWITH

Figure 1:
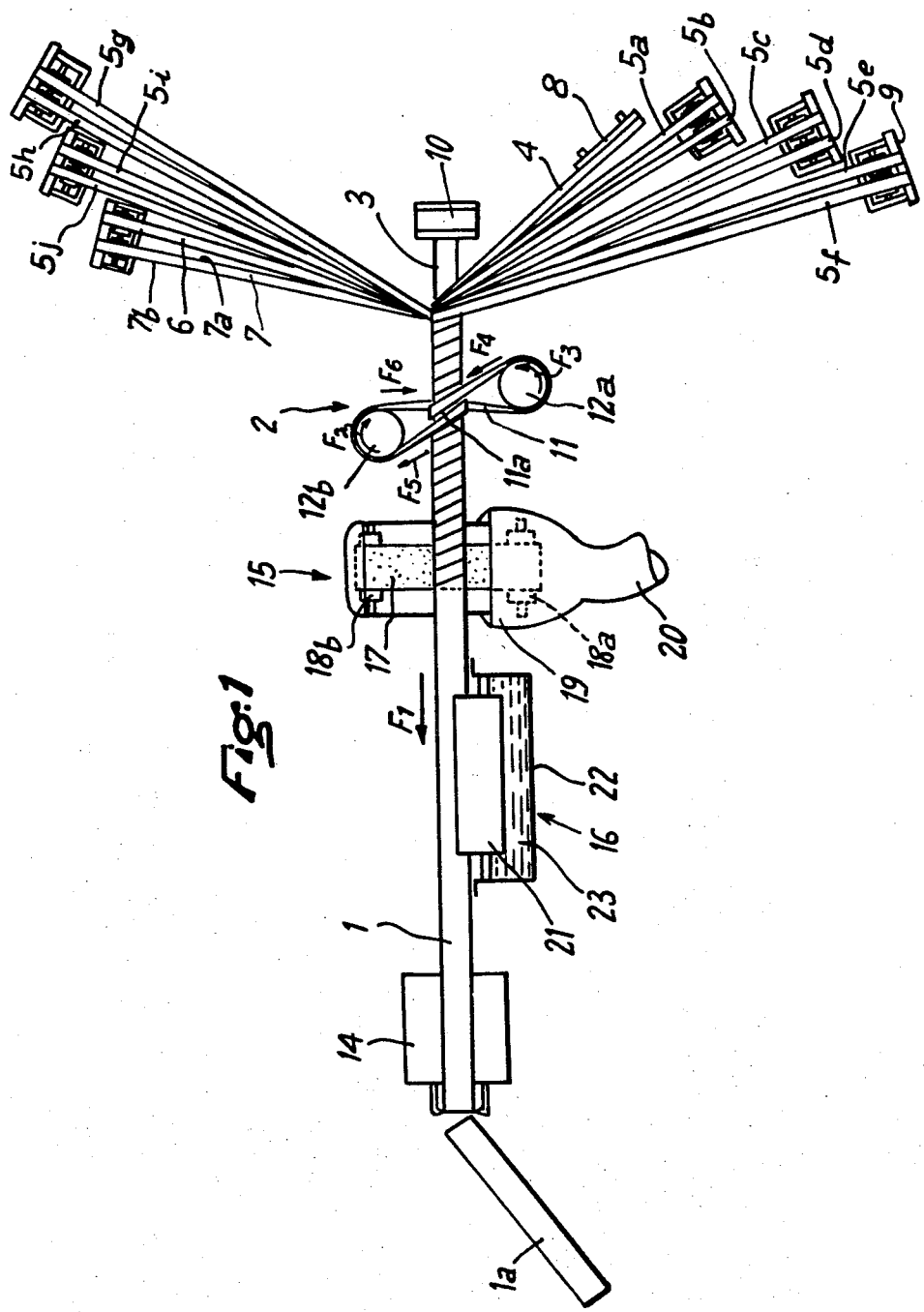
FIG. 1 is a diagrammatic view of a tube winding machine and some of the treating stations according to the invention.

Turning now to FIG. 1, first a rough tube 1 is prepared from which, ultimately, precisely gauged and smooth lengths of cardboard tube such as 1a, (FIG. 1) or 1b, (FIG. 4) are obtained. Tube 1 is made by the helical winding of a plurality of suitably gummed strips, 13 in the example shown, each strip representing a fraction or "layer" of the thickness of the wall of the tube.

The winding is performed in a tube winding machine 2. The machine incorporates a fixed mandrel 3 on which there are first wound a base strip 4 and ten intermediate strips 5a, 5b, 5c, 5d, 5e, 5f, 5g, 5h, 5i and 5j, constituting a basic tube onto which are then wound a penultimate strip 6 and a final strip 7. Each of the strips is stored on a reel; the strip 4 is disposed on a simple reel 8 while all the others are held on two-spindle reels, such as reel 9 carrying strips 5e and 5f.

In the example illustrated, said two-spindle reels are each provided with a gumming device to coat the lower face of each strip with adhesive. Any other gumming means may be used; for example, both surfaces of each strip may be coated with the exception of the first strip 4 and the last strip 7.

The first eleven strips, that is, strips 4 and 5a—5j form the basic tube and are made of fibrous material, such as kraft board, and are of substantially equal widths. The strip 6, forming the penultimate layer is of a low-density fibrous material, for example, felt board, having a normal thickness. The strip 7 constitutes the outside layer and is made of a dense material having long fibers, such as absorbent paper. The strip 7 is only slightly gummed; it has a width slightly greater than that of the other strips and is provided with a chamfered edge 7a opposite to the direction of advance of the tube (FIGS. 2 and 3). Said chamfered edge is the result of an abrading operation.

Each strip approaches the mandrel tangentially and is wound thereon in such a manner that it is out of alignment therealong relative to the preceding, underlying strip.

The article thus prepared constitutes the rough tube 1 which is driven so that it rotates about the mandrel 3 and is axially advanced in the direction of arrow F1 away from the head 10 by an endless belt 11 following a course 11a about the tube. Belt 11 is driven by two driving pulleys 12a and 12b, the axes of which are perpendicular to that of the mandrel. The directions of motion of the pulleys and the belt flights are indicated by the arrows F2, F3, F4, F5 and F6.

The winding pitch is controlled in such a manner that adjacent edges of two consecutive turns of any layer, with the exception of the final strip 7, are as close as possible without risking overlapping. Stated in different terms, the only tolerance to be accepted will merely vary the size of a slight spacing, such as 13a, 13b, 13c (FIGS. 2 and 3). Since the strip 7 is broader than the others, the adjacent edges of its successive turns overlap: the simple edge 7b of the strip 7 covers the chamfered edge 7a. It is to be noted that the tolerance discussed hereinabove may vary only the size of the slight overlap of the edge 7b on the beginning of the chamfer.

With the tube winding machine 2 there is associated a cutting station 14 in which a saw or knives sever the tube 1 into predetermined lengths such as 1a (FIG. 1).

Between the tube winding machine and the cutting station 14 there are disposed a sanding station 15 and a coating station 16. For sake of clarity, the stations 15 and 16 are shown in elevation while the tube winding machine 2 is shown in a plan view in FIG. 1.

In the example illustrated, the sanding station 15 is constituted by an endless abrasive belt 17 tensioned between two rollers 18a, 18b, one of which provides the drive. The whole unit is contained in a casing open towards the tube to be treated and linked by a conduit 20 to a dust-removing vacuum unit (not shown). The belt 17 bears upon the external surface of the tube 1, and "erases" the rough, helically extending portions formed by the edge 7b of the outside strip 7 and, at the same time, straightens out or aligns its long fibers. On leaving the sanding station 15, the outer surface of the still rough tube 1 is thus uniform and felted.

Next, the tube 1 arrives at the coating station 16. In the example shown, this station comprises a roller 21 partially immersed in a bath 22 containing the coating liquid 23. The latter is constituted by an aqueous solution of thermosetting resin to which a polymerization catalyst is added. Good results are obtained with a phenol resin in aqueous solution having a pH value in the vicinity of 8.5 and containing 35—50 percent of dry extract and using a lactic acid solution as the catalyst. Preferably, a lubricating agent is added to the solution to prevent the adhesion of the treated surface to metals. Such a lubricant may be, for example, a 35 percent silicone emulsion mixed in with the resin solution in a proportion of 1 percent by volume. The coating operation is controlled in such a manner as to obtain a substantially uniform deposit of, for example, 140 gr./m².

The number and the thickness of the layers, the adhesive and resin coatings, are calculated in such a manner as to obtain an external tube diameter 1—2 percent greater than the nominal diameter desired for the finished tubes.

From the outlet of the cutting station 14 the lengths 1a are advanced into a drier, not shown, heated to a temperature below the polymerization temperature of the resin (for example 100° C.) yet sufficient to cause evaporation of the solvents.

Finally, the dried lengths are conveyed to a surfacing machine (FIG. 4) which comprises stand 24 on which there are coaxially arranged a hydraulic jack 25 and a steel die or matrix 26. The jack 25 comprises, in a known manner, a plunger 27 integral with a rod 28 terminating in a head 29. The plunger 27 reciprocates in a cylinder 30, one end of which has a fluidtight opening 30a through which the rod 28 extends. The cylinder is further provided at each of its ends with an aperture 31a and 31b serving alternately for the admission and the discharge of the actuating fluid. The total stroke of the plunger 27 is greater than a cut tube length. The matrix 26 is formed of a cylindrical jacket having an inner wall 26a which has a length substantially equal to a cut tube length. One end of inner wall 26a facing jack 25 terminates in a conically flaring inlet opening 26b. The jacket further has an outer wall 32 which, together with inner wall 26a, defines an annular space 33 in which a heated fluid circulates. This fluid is introduced into annular space 33 through a channel 34a and taken out through a channel 34b. The outer wall 32 is thermally insulated; the fluid therein is circulated with a speed that is sufficiently great to ensure a substantially uniform and constant temperature of the inner wall 26a of the matrix. This temperature should correspond to the polymerization temperature of the resin used at station 16. The inner wall 26a is accurately dimensioned; its bore—taking into account its heat expansion—corresponds to the desired nominal external diameter for the finished tubes. Further, the internal surface of inner wall 26a is chromed so that the lubricant added to the resin suffices to prevent the adhesion of the resin to the hot metal.

OPERATION OF THE SURFACING MACHINE

In view of the foregoing structural description of the surfacing machine the method practiced therewith will be easily understood:

First, the plunger 27 is in a withdrawn position adjacent the aperture 31b and the head 29 is spaced from the inlet 26b at a distance greater than the length of the cut tube 1a. Then, tube 1a is engaged at one end by the head 29. The driving fluid for the jack is then admitted through the aperture 31b and, as a result, the plunger 27 is driven towards the other end of the cylinder 30 whereupon the cut length 1a is forcibly introduced into the inner wall 26a of the matrix aided by the conical entry 26b. The space between the cylinder 30 and the inlet 26b is such that the plunger 27 reaches the end of the cylinder 30 when the cut length 1a has completely entered the inner wall 26a. In order to be received by inner wall 26a, the diameter of tube 1a undergoes a reduction which is made possible to a large extent by the radial compression of the penultimate layer 6 made of felt board. By virtue of the temperature of the inner wall 26a, the resin deposited on the outside surface of the tube undergoes a polymerization which gives said surface a very smooth finish and a certain degree of hardness. The driving fluid of the jack is then reversed by admitting it under pressure through the aperture 31a. Simultaneously, the aperture 31b is relieved of all pressure to allow the evacuation of the fluid filling the rear chamber of the jack. The plunger 27 withdraws and returns to its initial position in the vicinity of the aperture 31b. The cycle restarts when a new cut tube length 1b is engaged by the head 29. As tube 1b enters into the matrix, it displaces finished tube 1a, which is thus ejected.

DESCRIPTION OF AN ALTERNATE TUBE STRUCTURE

Figure 4:
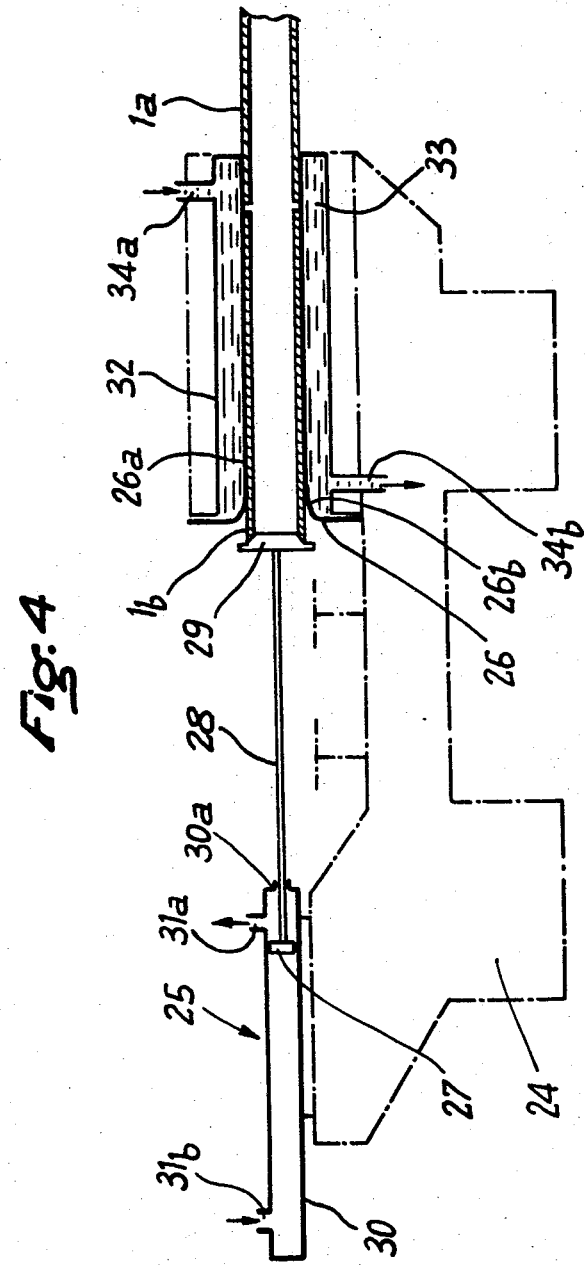
FIG. 4 is a diagrammatic view of a surfacing machine to ensure the precise gauging and the finishing of the tube surface according to the invention.

Turning now to FIGS. 5 and 6, there is shown a modified tube structure before (FIG. 5) and after (FIG. 6) treatment in the surfacing machine described in connection with FIG. 4. In these figures only a penultimate layer 101 and a final layer 102 are shown; both are wound helically. The basic tube structure is thus not shown.

The penultimate layer 101 is a strip of a low-density material, for example, felted board, between the consecutive turns 101a, 101b, 101c, of which there is shown a spacing 103a, 103b.

The final layer 102 is a strip of absorbent paper, both edges 105a, 105b of which are chamfered. The width of this strip is such that its consecutive turns 102a, 102b do not overlap but define a smallest possible spacing 104.

The final layer 102 is glued to the penultimate layer by means of a coating 106 of a thermosetting adhesive resin.

The treatment of the advancing rough tube having a structure according to FIG. 5, is, with the exception of the sanding step, identical to that described hereinbefore. Thus, its treatment comprises coating with a thermosetting resin mixed with a polymerization catalyst, cutting the tube into lengths, drying and finally reduction of circumference and setting in a surfacing machine.

The shrinkage or reduction in circumference is, to a large extent, taken up by the penultimate layer 101 which is compressed under the effect of external forces (FIG. 6). This compression or collapse of strip 101 is irregular: it is greater along the central part of the final layer 102 than along the chamfered edges 105a, 105b thereof. At the same time, the spacings 103a, 103b between the turns of the layer 101 are reduced to a greater or lesser extent.

Since the diametrical reduction of the tubes takes place in the matrix under elevated temperatures, simultaneously with the polymerization of the external resin coating 107, a polymerization of the layer 106 of adhesive resin is also achieved. This last-named polymerization stabilizes the layer 101, the deformation of which, as shown in FIG. 6, becomes permanent, while the cured resin in the helical space or gap 104 between consecutive turns of the external layer 102 acts as a seal.

Again, very smooth and accurately gauged tubes are obtained.

I claim:

1. A method of making a multilayer, helically wound cardboard tube of predetermined diameter, comprising the following steps:
   A. helically winding a compressible strip of low-density material on a basic tube;
   B. helically winding an outer or last strip over said compressible strip;
   C. providing a thermosetting coating on said last strip, said coating forming the outer face of said multilayer, helically wound cardboard tube;
   D. forcing said tube through a die for reducing the outer diameter of said tube by causing radial compression of said compressible strip; and
   E. simultaneously with step subjecting said tube to a heat treatment in said die to effect polymerization of said thermosetting resin.

2. A method as defined in claim 1, including the step of gluing sad last strip to said compressible strip with a thermosetting resin layer simultaneously with step (B), and polymerizing said last-named resin layer.

3. A method according to claim 1, wherein one edge of said outer strip is chamfered; said step (B) is performed in such a manner that the other edge of said outer strip overlaps the chamfered edge; subsequent to step (B) but prior to step (D) said tube is submitted to an abrading step to eliminate helical protrusions caused by said overlap.

4. A method as defined in claim 1, wherein subsequent to step (C), but prior to step (D) said tube is submitted to a drying step at a temperature sufficient to cause evaporation of solvents in said thermosetting resin, but insufficient to cause polymerization thereof.

5. A method as defined in claim 1, wherein said thermosetting resin contains a polymerization catalyst.

6. A method as defined in claim 1, wherein said tube is cut into predetermined lengths subsequent to step (B), but prior to step (D).

7. A method as defined in claim 1, wherein said basic tube is made by helically winding a plurality of strips in a superposed relationship, the winding pitch of each strip, except said outer strip, is at least as large as the strip width to prevent overlapping of the edges of the same strip; each strip is wound in such a manner as to overlap adjacent turns of the immediately underlying strip.

8. A method as defined in claim 1, wherein said outer strip is slightly glued to said compressible strip during step (B).

9. A method as defined in claim 1, wherein both edges of said outer strip are chamfered; said step (B) is performed in such a manner that the chamfered edges are arranged in an adjoining relationship.

10. A method as defined in claim 9, wherein during the winding of said outer strip adjoining chamfers of immediately adjacent turns slope towards one another and towards the inside of the tube.

PO-1050
(5/69)

UNITED STATES PATENT OFFICE
CERTIFICATE OF CORRECTION

Patent No. 3,580,146  Dated May 25, 1971

Inventor(s) Joseph Biancamaria

It is certified that error appears in the above-identified patent and that said Letters Patent are hereby corrected as shown below:

In col. 5, line 23, after "step" should be inserted the letter --D--

Signed and sealed this 21st day of December 1971.

(SEAL)
Attest:

EDWARD M. FLETCHER, JR.
Attesting Officer

ROBERT GOTTSCHALK
Acting Commissioner of Patents